(12) United States Patent
Huang et al.

(10) Patent No.: US 12,229,752 B2
(45) Date of Patent: *Feb. 18, 2025

(54) METHOD AND SYSTEM FOR REGULATION OF BLOCKCHAIN TRANSACTIONS

(71) Applicant: MASTERCARD INTERNATIONAL INCORPORATED, Purchase, NY (US)

(72) Inventors: Donghao Huang, Singapore (SG); Hancong Guan, Singapore (SG); Srinath Ravinathan, Singapore (SG); Mohammed Sadiq Ahmad, Dublin, CA (US); Rajasekaran Dhamodharan, San Carlos, CA (US); Steven C. Davis, Saint Peters, MO (US); Rakesh Yadav, Cape Elizabeth, ME (US); Sébastien Le Callonnec, Greystones (IE); David James Fleming, Wicklow (IE)

(73) Assignee: MASTERCARD INTERNATIONAL INCORPORATED., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,471

(22) Filed: Apr. 4, 2023

(65) Prior Publication Data
US 2023/0245105 A1  Aug. 3, 2023

Related U.S. Application Data

(63) Continuation of application No. 17/005,484, filed on Aug. 28, 2020, now Pat. No. 11,640,601.

(51) Int. Cl.
*G06Q 20/36* (2012.01)
*G06Q 20/40* (2012.01)
(Continued)

(52) U.S. Cl.
CPC ..... *G06Q 20/3674* (2013.01); *G06Q 20/4012* (2013.01); *H04L 9/0637* (2013.01); *H04L 9/30* (2013.01); *H04L 9/50* (2022.05)

(58) Field of Classification Search
CPC .............................................. G06Q 20/00–425
See application file for complete search history.

(56) References Cited

U.S. PATENT DOCUMENTS 10,318,943 B1 * 6/2019 Ellis ....................... G06Q 20/20
11,188,899 B2   11/2021 Yang
(Continued)

FOREIGN PATENT DOCUMENTS

| JP | 2018519577 A | 7/2018 |
| JP | 2018530175 A | 10/2018 |
| WO | 2019022845 A1 | 1/2019 |

OTHER PUBLICATIONS

Bhavik et al. Blockchain-Based Auditing Platform for Transparent Financial Transaction, 2019, Asian Accounting and Auditing Advancement, vol. 10, No. 1 (Year: 2019).*
(Continued)

*Primary Examiner* — Chenyuh Kuo
(74) *Attorney, Agent, or Firm* — Panitch Schwarze Belisario & Nadel LLP (57) ABSTRACT

A method for assisting wallet providers in regulatory compliance for blockchain transactions includes: receiving, by a receiver of a processing server, a new blockchain transaction from a first computing device, the new blockchain including at least a destination address associated with a blockchain wallet as a recipient for the new blockchain transaction; generating, by a processor of the processing server, a reference identifier for the new blockchain transaction; identifying, by the processor of the processing server, a profile for the blockchain wallet based on the destination address; transmitting, by a transmitter of the processing server, the
(Continued)

reference identifier to the first computing device; and transmitting, by the transmitter of the processing server, a notification message to a second computing device, the notification message including at least the reference identifier and data associated with the blockchain wallet.

20 Claims, 5 Drawing Sheets

(51) Int. Cl.
  *H04L 9/06* (2006.01)
  *H04L 9/30* (2006.01)
  *H04L 9/00* (2022.01)

(56) References Cited

U.S. PATENT DOCUMENTS

| | | | |
|---|---|---|---|
| 2007/0255662 | A1 | 11/2007 | Tumminaro |
| 2016/0300222 | A1 | 10/2016 | Yang |
| 2016/0342989 | A1 | 11/2016 | Davis |
| 2017/0005804 | A1* | 1/2017 | Zinder ............... G06F 21/6254 |
| 2017/0243287 | A1* | 8/2017 | Johnsrud ............. G06Q 40/025 |
| 2018/0053160 | A1* | 2/2018 | Schwartz ............. G06Q 20/389 |
| 2019/0012695 | A1 | 1/2019 | Bishnoi et al. |
| 2019/0028280 | A1 | 1/2019 | Zinder |
| 2019/0139136 | A1* | 5/2019 | Molinari ............... G06Q 40/06 |
| 2019/0188657 | A1* | 6/2019 | Arora ............... G06Q 20/38215 |
| 2019/0220854 | A1 | 7/2019 | Pesci et al. |
| 2019/0318424 | A1* | 10/2019 | McWilliams ........ G06Q 20/405 |
| 2019/0349203 | A1 | 11/2019 | Scherrer et al. |
| 2021/0182837 | A1* | 6/2021 | Sears ..................... G06F 21/64 |
| 2021/0350343 | A1* | 11/2021 | Gaur .................... G06Q 20/027 |

OTHER PUBLICATIONS

Notice of Reasons for Refusal, dated Feb. 6, 2024, issued in corresponding Japanese Patent Application No. 2023-513871, including English-language translation, 7 pages.

Notification of Transmittal of the International Search Report (Forms PCT/ISA/220 and PCT/ISA/210) and the Written Opinion of the International Searching Authority (Form PCT/ISA/237) issued Nov. 11, 2021, by the International Application Division Korean Intellectual Property Office in corresponding International Application No. PCT/US2021/042325. (11 pages).

Extended European Search Report, dated Mar. 28, 2024, issued in corresponding European Application No. 21862322.1-1218, 8 pages.

* cited by examiner

METHOD AND SYSTEM FOR REGULATION OF BLOCKCHAIN TRANSACTIONS

FIELD

The present disclosure relates to assisting wallet providers in regulatory compliance for blockchain transactions, specifically the use of a digital asset network as a third party to a blockchain transaction to facilitate compliance with regulatory requirements through proper data storage and notification.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. Anonymity in blockchain transactions provides a strong incentive for individuals and merchants that do not want their transaction history available to the public while still retaining other benefits of a blockchain, such as the immutability, auditability of the record, etc.

However, some merchants and consumers may be in an industry or location where their involvement in payment transactions are subject to regulation by a government or other organization. For example, a government agency may regulate the purchase and sell of specific minerals or chemical compounds. In such cases, transactions cannot be performed using a blockchain without providing the regulatory agency with information regarding the identity of each party involved, which is historically unavailable in blockchains. Furthermore, even if a party in a blockchain transaction is willing to provide information regarding their identity for the sake of regulation, blockchain systems currently lack any reporting capabilities. Thus, there is a need for a blockchain where anonymity can be retained in the public record of the blockchain, while still enabling regulatory agencies to ensure compliance in blockchain transactions without sacrificing the immutability or other advantages of the blockchain.

SUMMARY

The present disclosure provides a description of systems and methods for assisting wallet providers in regulatory compliance for blockchain transactions. A service provider, which may be referred to here as a "digital asset network" may operate as an intermediary in a blockchain transaction conducted between two users having separate wallet providers. The service provider generates a transaction reference for each blockchain transaction, which it provides to the wallet provider that is submitting the transaction to the blockchain and included in the blockchain submission. At the same time, the service provider can provide a notification to the wallet provider for the recipient of the transaction with the transaction reference, enabling the wallet provider to know that a user, and which user, is receiving funds, to help in providing information to a regulatory agency. Both wallet providers can keep the service provider apprised of any information needed for regulatory agencies, where the service provider can provide reporting thereof, as the service provider is aware of all transactions and can provide the regulatory agency with references thereto. The result is that the public blockchain remains immutable and can be entirely anonymous when viewed by the average user, but where wallet providers are kept apprised of their users' transactions and where a regulatory agency can be automatically kept up-to-date on transaction activity and the identity behind such transactions for ensuring compliance with regulations.

A method for assisting wallet providers in regulatory compliance for blockchain transactions includes: receiving, by a receiver of a processing server, a new blockchain transaction from a first computing device, the new blockchain including at least a destination address associated with a blockchain wallet as a recipient for the new blockchain transaction; generating, by a processor of the processing server, a reference identifier for the new blockchain transaction; identifying, by the processor of the processing server, a profile for the blockchain wallet based on the destination address; transmitting, by a transmitter of the processing server, the reference identifier to the first computing device; and transmitting, by the transmitter of the processing server, a notification message to a second computing device, the notification message including at least the reference identifier and data associated with the blockchain wallet.

A system for assisting wallet providers in regulatory compliance for blockchain transactions includes: a first computing device; a second computing device; and a processing server, wherein the processing server includes a receiver receiving a new blockchain transaction from a first computing device, the new blockchain including at least a destination address associated with a blockchain wallet as a recipient for the new blockchain transaction, a processor generating a reference identifier for the new blockchain transaction, and identifying a profile for the blockchain wallet based on the destination address, and a transmitter transmitting the reference identifier to the first computing device, and transmitting a notification message to a second computing device, the notification message including at least the reference identifier and data associated with the blockchain wallet.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Regulatory Compliance of Blockchain Transactions

Figure 1:
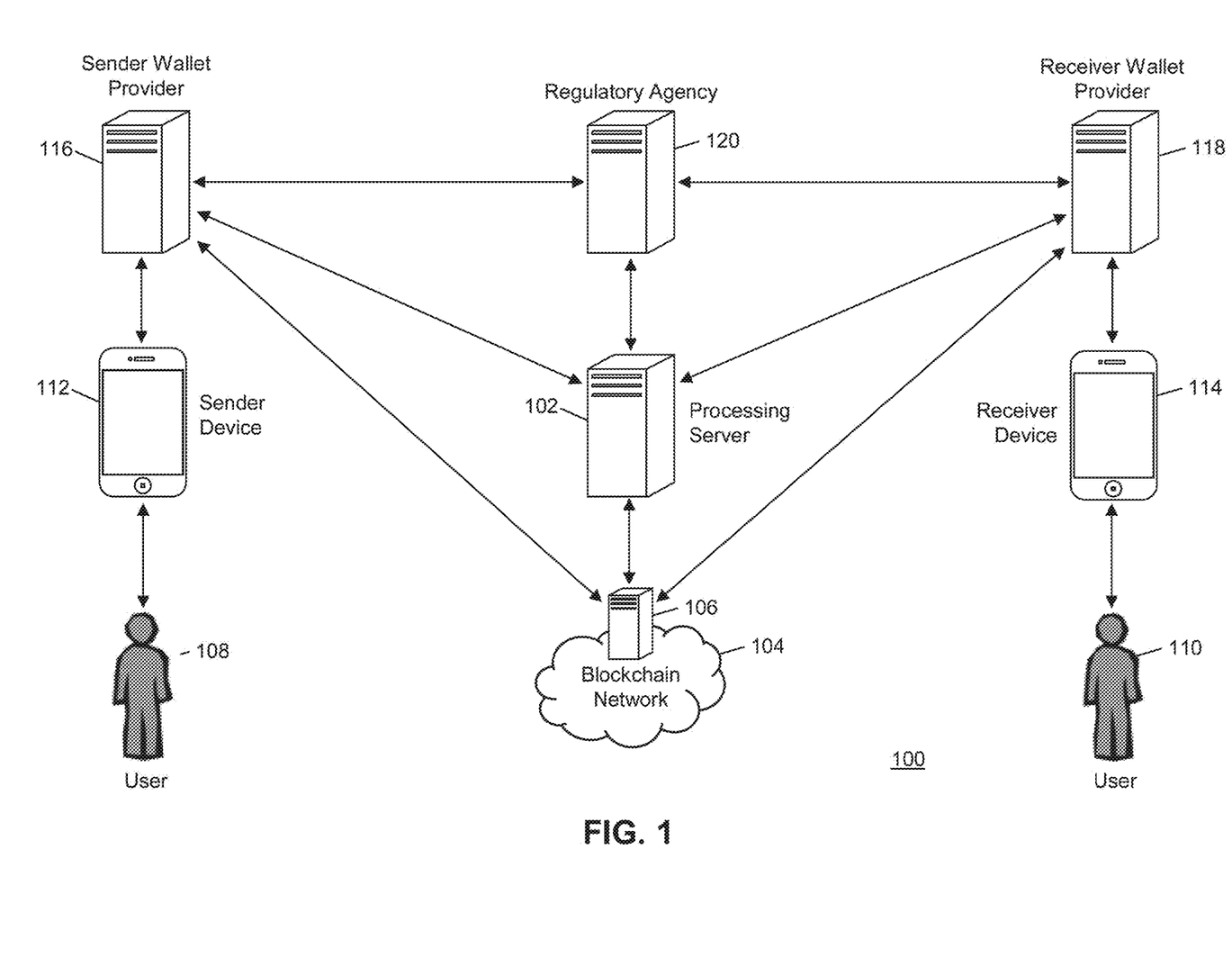
FIG. 1 is a block diagram illustrating a high level system architecture for assisting wallet providers in regulatory compliance in accordance with exemplary embodiments.

FIG. 1 illustrates a system 100 for ensuring regulatory compliance with blockchain transactions through a third party service provider operating a digital asset network with profiles on participating blockchain wallets.

Figure 2:
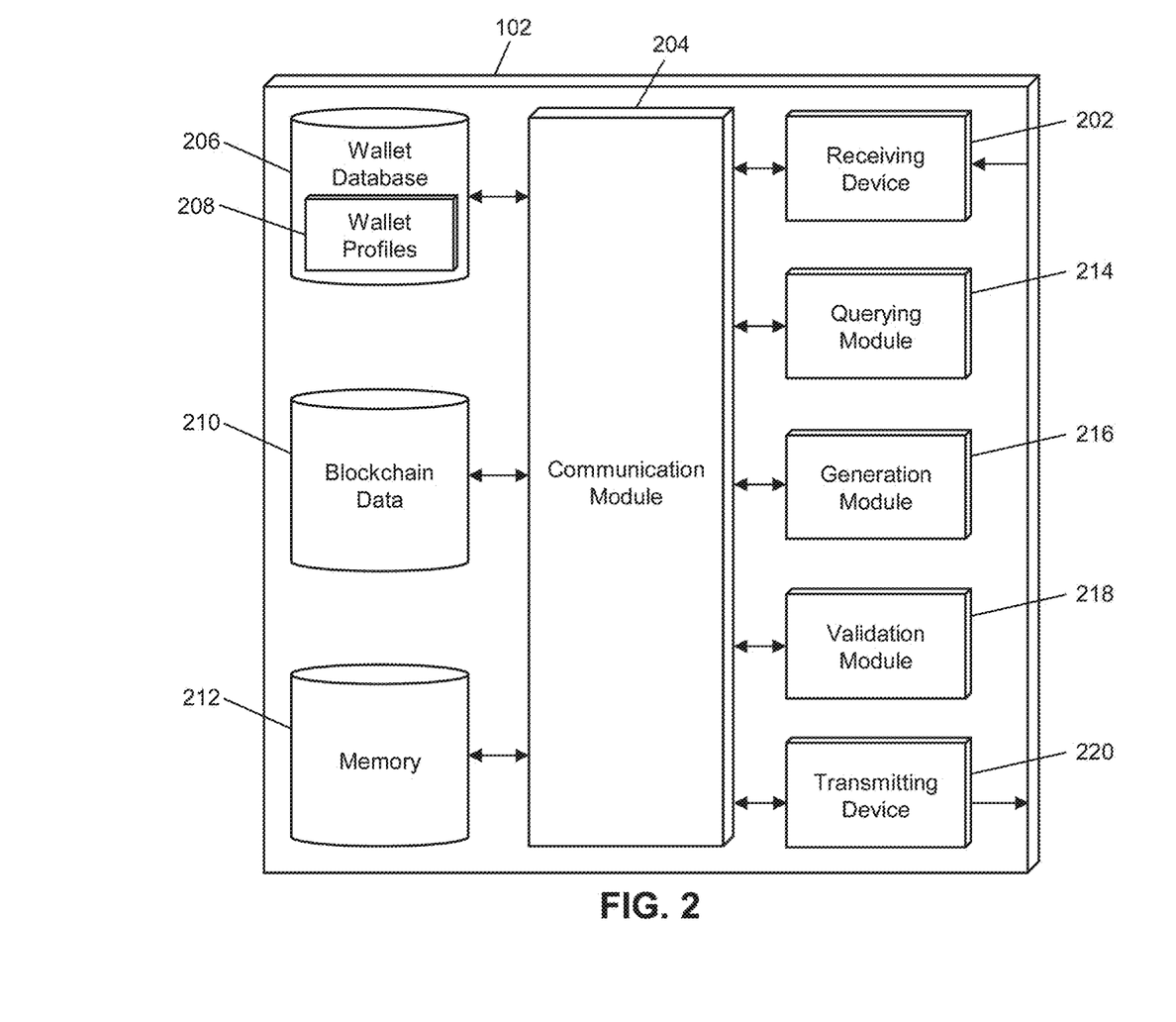
FIG. 2 is a block diagram illustrating the processing server of the system of FIG. 1 for assisting wallet providers in regulatory compliance in accordance with exemplary embodiments.
Figure 5:
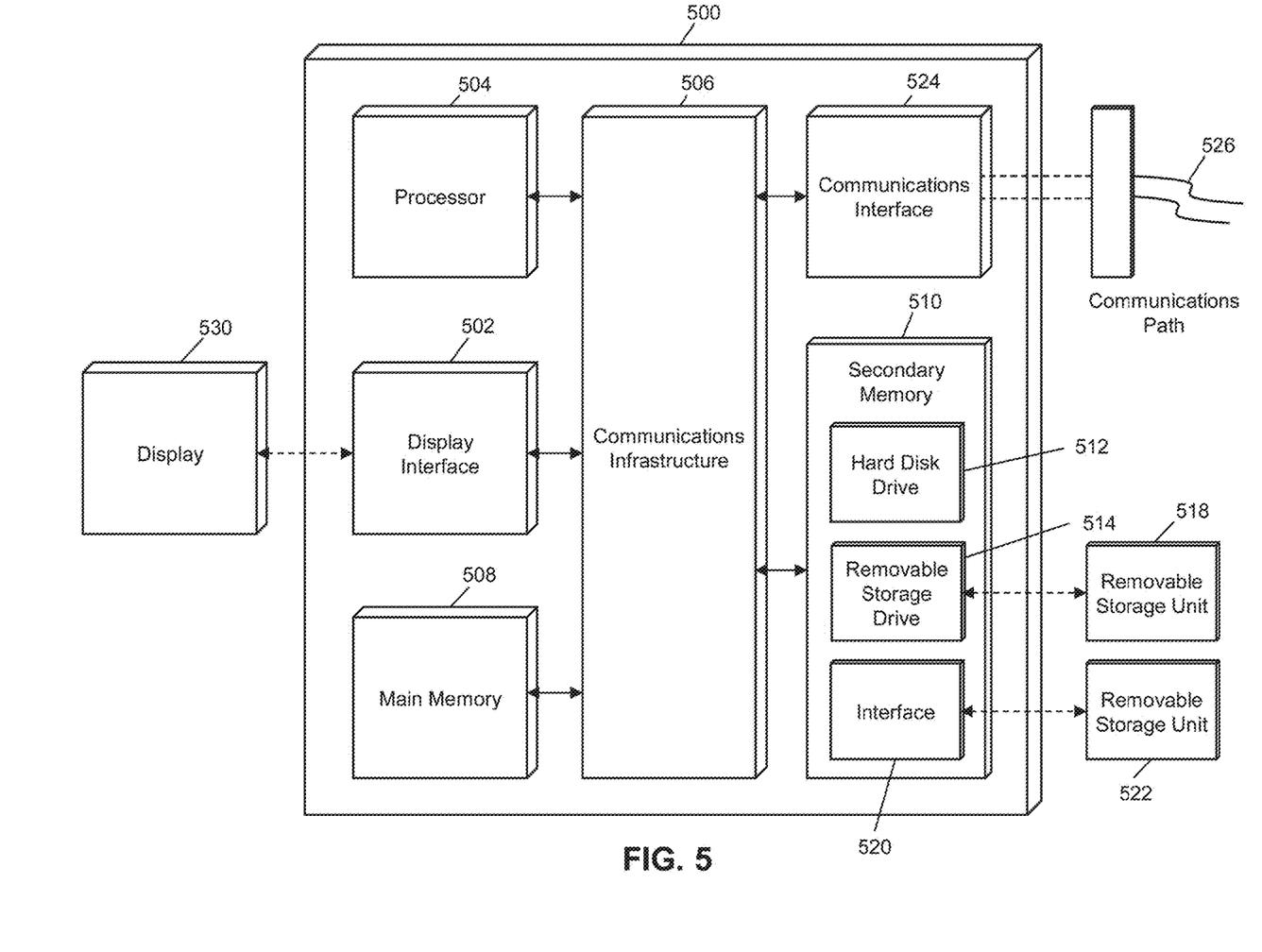
FIG. 5 is a block diagram illustrating a computer system architecture in accordance with exemplary embodiments.

The system 100 may include a processing server 102. The processing server 102, discussed in more detail below, may operate a digital asset network for assisting in regulatory compliance of blockchain transactions via the functions discussed herein. The system 100 may also include a blockchain network 104. The blockchain network 104 may be comprised of a plurality of blockchain nodes 106. Each blockchain node 106 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may also be a blockchain node 106 in the blockchain network 104. In some cases, one or more blockchain nodes 106 may be configured to perform the functions of the processing server 102 as discussed herein.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 112 and receiver device 114) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 112) that is generated using the sender's private key, a blockchain address of the recipient of currency (e.g., a receiver device 114) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 106 in the blockchain network 104, either by the sender (e.g., user 108 using the sender device 112) or the recipient (e.g., user 110 using the receiver device 114). The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 106 in the blockchain network 104 in traditional blockchain implementations. In cases where a blockchain data value may not be related to a blockchain transaction, but instead the storage of other types of data, blockchain data values may still include or otherwise involve the validation of a digital signature.

In the system 100, a user 108 and user 110 may want to participate in a blockchain transaction to affect payment for a transaction that may be subject to one or more rules or regulations by a regulatory agency 120. The regulatory agency 120 may be a government agency, non-governmental organization, or any other entity that may provide or enforce rules or regulations for transaction activity. For example, the user 108 and user 110 may negotiate for the sale of an exotic animal, which may be subject to regulations by state or federal organizations as the regulatory agencies 120. The user 108 and user 110 may exchange suitable information for the blockchain transaction, such as the user 110 generating a recipient address for their blockchain wallet using their receiver device 114, which may be provided to the user 108 and their sender device 112, such as through an electronic transmission or manual input by the user 108 in the sender device 112.

The sender device 112 and receiver device 114 may each have a wallet provider, illustrated in FIG. 1 as the sender wallet provider 116 and the receiver wallet provider 118. Wallet providers may be entities that operate application programs that facilitate the use of a blockchain wallet for electronic payment transactions conducted via a blockchain. In some cases, a wallet provider may store the private keys for a blockchain wallet on behalf of their users. In other cases, the user devices may retain the private keys on the devices themselves, where the wallet provider may publish an application program that performs the functions necessary for participation in blockchain transactions, such as the generation of addresses, generation of digital signatures, storage of unspent transaction outputs, and transmission of data for a new blockchain transaction to a blockchain node 106. In the system 100, the sender device 112 may receive a destination address for the receiver device's blockchain wallet and a cryptocurrency amount to be transferred to that address from the user's blockchain wallet, and may identify the unspent transaction output(s) necessary to facilitate the transaction, as well as generating any digital signatures needed to ensure that the transaction is validated and confirmed.

The sender device 112 may make the information for the blockchain transaction available to the sender wallet provider 116, such as through the application program published by the sender wallet provider 116. Prior to submitting the blockchain transaction to a blockchain node 106 for confirmation, the sender wallet provider 116 may provide transaction data to the processing server 102. The processing server 102 may generate a reference identifier for the new transaction, which may also be referred to herein as a transaction reference. The reference identifier may be a unique value that is unique to the transaction, such as a number, alphanumeric value, etc. The reference identifier may be transmitted back to the sender wallet provider 116 and used in any future transmissions regarding the new blockchain transaction between the user 108 and user 110. As part of the functions performed by the processing server 102, the processing server 102 may also identify the recipient blockchain wallet for the transaction. The processing server 102 may, using the destination address and any other information for the receiver device's blockchain wallet that was provided in the transaction (e.g., a public key), identify a wallet profile for the blockchain wallet. If the wallet profile already exists, the processing server 102 may identify information included therein associated with the receiver device 114 and/or user 110, which may be relevant to regulatory compliance for the new blockchain transaction. For example, the wallet profile may include a name, business name, geographic location, past transaction history, or other data that may be provided by users to ensure ongoing compliance with the regulatory agency 120.

If the wallet profile does not already exist, the processing server 102 may contact the receiver wallet provider 118 that operates or otherwise assists in the use of the receiver device's blockchain wallet to request information for the wallet profile. The receiver wallet provider 118 may be identified via the destination address, public key, or other data available that is associated with the receiver device 114 or user 110 included in the submission from the sender wallet provider 116. For instance, the public key may include an identification number registered with the receiver wallet provider 118. The receiver wallet provider 118 may then provide wallet profile data back to the processing server 102. In some cases, the processing server 102 may specify the data being requested. For example, the transaction may be subject to rules set by a specific regulatory agency 120 where specified data is required, and so the processing server 102 may request that specified data from the receiver wallet provider 118. In instances where the receiver wallet provider 118 may not already possess such data, it may request the data from the user 110 via the receiver device 114, such as using the application program that is executed by the receiver device 114 for use and operation of the blockchain wallet. The processing server 102 may receive the data and store the data in a wallet profile for the blockchain wallet accordingly. In some embodiments, even if a wallet profile exists for the blockchain wallet, the processing server 102 may request updated information from the receiver wallet provider 118 when a new transaction is being submitted, or if a new transaction is submitted and the wallet profile has not been updated for a predetermined amount of time (e.g., weekly, bi-weekly, monthly, etc.).

The processing server 102 may thus have updated information regarding the user 110 as a recipient for the transaction. In some embodiments, the processing server 102 may also identify a wallet profile for the user 108 as the sender in the transaction, where such a process may occur upon receipt of the new blockchain transaction submission from the sender wallet provider 116. For instance, the sender wallet provider 116 may include updated wallet profile data with the blockchain transaction submission, or such data may be requested after the processing server 102 identifies the wallet profile for the sender device's blockchain wallet, if necessary. In some embodiments, when the processing server 102 provides the reference identifier for the transaction back to the sender wallet provider 116, wallet profile data for the receiver device 114 may be included. For example, the sender wallet provider 116 may require profile data for the user 110 to ensure compliance with the regulatory agency 120 in the new blockchain transaction. In some instances, no specific data regarding the user 110 or receiver device 114 may be provided. For example, the processing server 102 may transmit a notification to the sender wallet provider 116 that sufficient profile data for the user 110 is on file, and that the blockchain transaction is clear to proceed.

The sender wallet provider 116 may then initiate the blockchain transaction for payment from the sender device's blockchain wallet to the receiver device's blockchain wallet for the specified cryptocurrency amount. Initiation of the blockchain transaction may include transmission of the new blockchain transaction (e.g., unspent transaction output(s), digital signature(s), destination address(es), and cryptocurrency amounts for each destination address) to a blockchain node 106 in the blockchain network 104. In some instances, the blockchain transaction may be transmitted to the processing server 102, which may operate as a blockchain node 106 or may forward the blockchain transaction to a blockchain node 106. The blockchain node 106 may then confirm the transaction and include the transaction in a new block that is confirmed and added to the blockchain using traditional methods and systems. In an exemplary embodiment, the blockchain transaction may include the reference identifier when added to the blockchain.

In some embodiments, the methods and systems discussed herein may be configured to operate for non-blockchain transactions. In such embodiments, the sender wallet provider 116 may conduct an electronic payment transaction using a fiat-based currency and/or a card-based payment network. In such instances, data regarding the payment transaction may be captured and stored in a blockchain data value in the blockchain, either in a clear format or through hashing (e.g., where the transaction data is hashed and can only be verified through knowledge of the underlying data). In these embodiments, the transaction data added to the blockchain may still include the reference identifier generated by the processing server 102.

In an exemplary embodiment, the receiver wallet provider 118 may be notified of the new transaction by the processing server 102. For instance, the processing server 102 may electronically transmit the new blockchain transaction (e.g., before being posted or after posting in the blockchain is complete) to the receiver wallet provider 118 along with the reference identifier. In some cases, the processing server 102 may provide a notification to the receiver wallet provider 118 regarding the transaction before the transaction takes place, such as after generation of the reference identifier, where the processing server 102 may provide the reference identifier and the destination address and any other data for the receiver device's blockchain wallet as received from the sender wallet provider 116.

In some embodiments, once the blockchain transaction has been completed, the receiver wallet provider 118 may identify the blockchain transaction using the reference identifier provided earlier by the processing server 102. The receiver wallet provider 118 may then transmit a notification to the processing server 102 indicating that the transaction was completed, and may also update the profile data for the receiver device's wallet profile accordingly, such as to include the transaction data or account for any other changes due to the new transaction. In some embodiments, the processing server 102 may provide an update of the wallet profile data for the sender device's blockchain wallet to the receiver wallet provider 118 once the transaction has been confirmed. In such cases, both the sender wallet provider 116 and the receiver wallet provider 118 may have profile data from the opposing blockchain wallet, such as to assist in ensuring compliance with applicable rules and regulations.

In some embodiments, the sender wallet provider 116 and/or receiver wallet provider 118 may be asked to verify the transaction as processed. In such embodiments, the appropriate entity may transmit a verification message to the processing server 102 that includes the reference identifier and indicates that the transaction is verified (e.g., includes the proper information, such as cryptocurrency amount, destination address, etc.).

The sender wallet provider 116 and receiver wallet provider 118 may be able to provide information regarding regulatory compliance to the regulatory agency 120 accordingly. By receiving wallet profile data regarding the other entities involved in their blockchain transactions, the sender wallet provider 116 and receiver wallet provider 118 may have suitable information to provide to the regulatory agency 120 without being able to obtain information regarding any other transactions in the blockchain, and while the blockchain can still remain public and can be yet entirely anonymous to any entities not involved in a particular transaction. In some embodiments, the processing server 102 may be able to make automatic reports to the regulatory agency 120 regarding transaction activity of blockchain wallets, such as by providing reference identifiers and wallet profile data for both entities involved in a transaction. In such cases, the processing server 102 may have reference identifiers but may possess no other data regarding the transaction itself. In such embodiments, users 108 and users 110 may be able to transact with one another with regulation being monitored automatically by a regulatory agency 120 without any manual reporting by wallet providers or manual fetching by regulatory agencies 120 through use of the processing server 102.

Thus, the methods and systems discussed herein facilitate compliance with rules and regulations for blockchain transactions, with minimal interaction by the entities involved in the transactions themselves. To accomplish the compliance, sender wallet providers 116 must inform the processing server 102 of a new transaction and include a received reference identifier in the new transaction, and the sender wallet providers 116 and receiver wallet providers 118 must keep compliance information for their associated blockchain wallets up-to-date. The processing server 102, as specially configured herein, accomplishes the other functions necessary to ensure that regulatory agencies 120 are kept apprised of transactional data and that necessary wallet information for an anonymous blockchain transaction is available using a reference identifier to ensure compliance with regulations as necessary. Thus, blockchain transactions that remain publicly anonymous can be performed in compliance with any applicable rules and regulations.

Processing Server

FIG. 2 illustrates an embodiment of the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from blockchain nodes 106, sender wallet providers 116, receiver wallet providers 118, regulatory agencies 120, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain nodes 106 that are superimposed or otherwise encoded with blockchain data values and other blockchain data. The receiving device 202 may also be configured to receive data signals electronically transmitted by sender wallet providers 116 and receiver wallet providers 118, which may be superimposed or otherwise encoded with new transaction data, information regarding processed blockchain transactions, updated wallet profile data, reference identifiers with requests for transaction or wallet profile information, etc. The receiving device 202 may be further configured to receive data signals electronically transmitted by regulatory agencies 120 that may be superimposed or otherwise encoded with requests for wallet profile data, such as may include a reference identifier, or regulation data for use in collecting wallet profile data.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a wallet database 206. The wallet database 206 may be configured to store one or more wallet profiles 208 using a suitable data storage format and schema. The wallet database 206 may be a relational database that utilizes structured query language for the storage, identification, modifying, updating, accessing, etc. of structured data sets stored therein. Each wallet profile 208 may be a structured data set configured to store data related to a blockchain wallet. A wallet profile 208 may include, for example, a public key of the associated cryptographic key pair, information identifying an associated wallet provider, profile data, compliance data, transaction history, and other data as discussed herein. For instance, a wallet profile 208 may include any data gathered for use by a regulatory agency 120 or for use by wallet providers in ensuring compliance with rules and regulations for blockchain transactions involving the related blockchain wallet. Such profile data may include, for example, names, addresses, geographic locations, business names, transactional history, financial data, etc.

The processing server 102 may also include a memory 212. The memory 212 may be configured to store data for use by the processing server 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for blockchain nodes 106 and blockchain networks 104, address generation and validation algorithms, digital signature generation and validation algorithms, hashing algorithms for generating reference values, rules regarding generation of new blocks and block headers, a pool of pending transactions, base value data, etc.

The processing server 102 may also include blockchain data 210, which may be stored in the memory 212 of the processing server 102 or stored in a separate area within the processing server 102 or accessible thereby. The blockchain data 210 may include a blockchain, which may be comprised of a plurality of blocks and be associated with the blockchain network 104. In some cases, the blockchain data 210 may further include any other data associated with the blockchain and management and performance thereof, such as block generation algorithms, digital signature generation and confirmation algorithms, communication data for blockchain nodes 106, etc.

The processing server 102 may include a querying module 214. The querying module 214 may be configured to execute queries on databases to identify information. The querying module 214 may receive one or more data values or query strings, and may execute a query string based thereon on an indicated database, such as the wallet database 206 of the processing server 102 to identify information stored therein. The querying module 214 may then output the identified information to an appropriate engine or module of the processing server 102 as necessary. The querying module 214 may, for example, execute a query on the wallet database 206 to identify a wallet profile 208 for a receiver device's blockchain wallet in a new blockchain transaction submitted by a sender wallet provider 116, such as to identify profile data for providing thereto.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate new blockchain data values, new block headers, Merkle roots, new blocks, and other data for operation of the blockchain, to generate reference identifiers, to generate new wallet profiles 208, to generate reports regarding regulatory compliance, etc.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to confirm blockchain transactions, validate wallet profile data, validate digital signatures, validate received reference identifiers, etc.

The processing server 102 may also include a transmitting device 220. The transmitting device 220 may be configured to transmit data over one or more networks via one or more network protocols. In some instances, the transmitting device 220 may be configured to transmit data to blockchain nodes 106, sender wallet providers 116, receiver wallet providers 118, regulatory agencies 120, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 106 that are superimposed or otherwise encoded with new blockchain data values, new blocks for confirmation, confirmed blocks, messages regarding block or transaction confirmations, and other data used in the operation and management of the blockchain, or reference identifiers in requests for blockchain data value information. The transmitting device 220 may also be configured to electronically transmit data signals to sender wallet providers 116 and receiver wallet providers 118 that are superimposed or otherwise encoded with reference identifiers, wallet profile data, wallet profile data requests, regulatory compliance data, transaction data, blockchain data values, and other data as discussed herein.

Process for Updating Wallet Profile Regulatory Information

Figure 3:
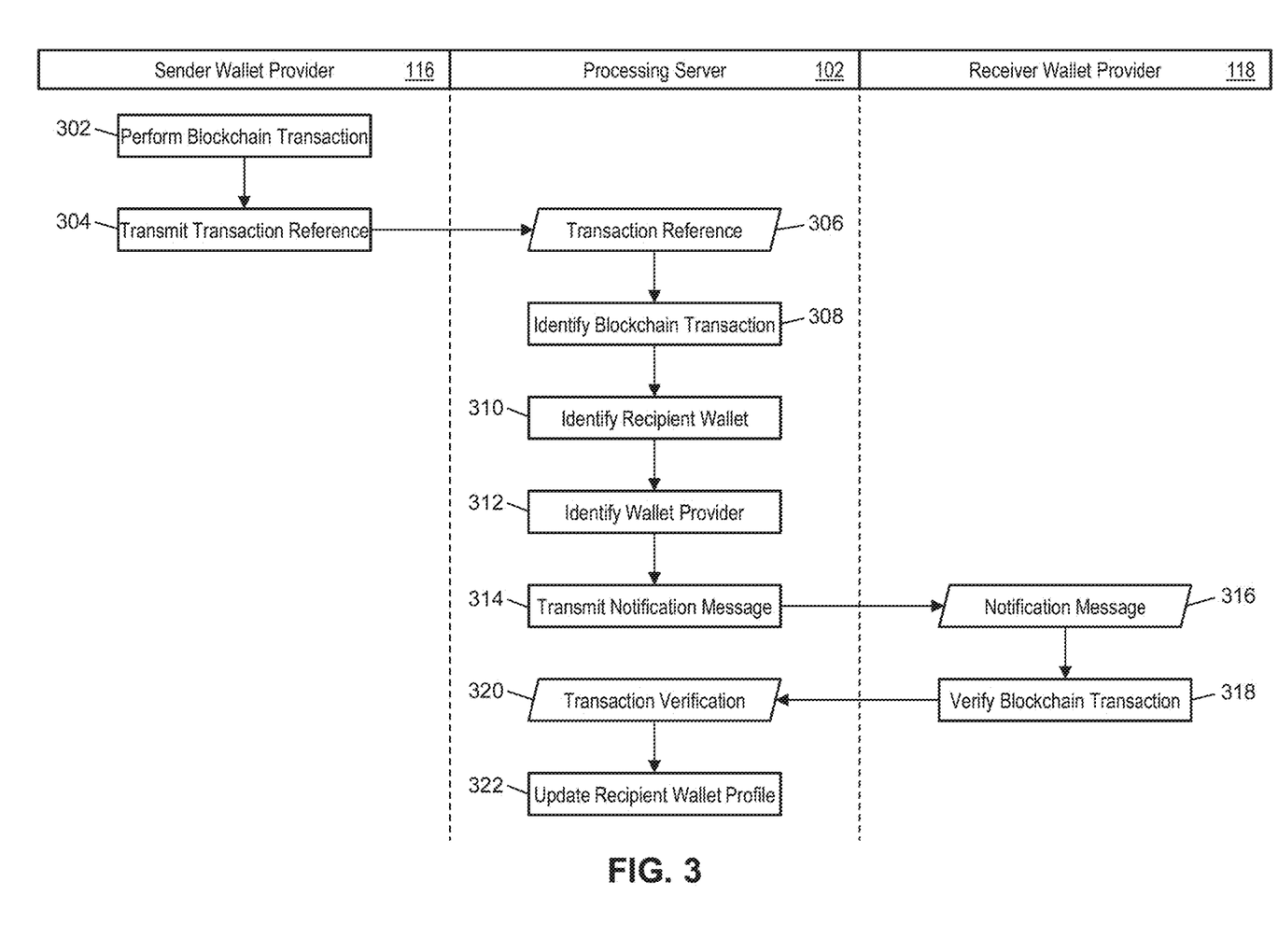
FIG. 3 is a flow diagram illustrating a process for conducting a blockchain transaction with regulatory compliance in the system of FIG. 1 in accordance with exemplary embodiments.

FIG. 3 illustrates a process for updating a wallet profile 208 to for facilitating ongoing compliance with rules and regulations following a blockchain in the system 100 of FIG. 1 using the processing server 102.

In step 302, the sender wallet provider 116 may perform a new blockchain transaction for payment from a sender device 112 to a receiver device 114 using blockchain transaction data from the sender device 112. The transaction data may include a digital signature, one or more unspent transaction outputs, one or more destination addresses, and, for each destination address, a cryptocurrency amount to be transferred thereto, where one of the destination addresses is to a blockchain wallet of the receiver device 114. The new blockchain transaction may also include a reference identifier submitted by the sender wallet provider 116, such as previously provided thereto by the processing server 102, such as in the process discussed above. In step 304, the sender wallet provider 116 may electronically transmit the transaction reference for the new blockchain transaction to the processing server 102. In some cases, the transaction reference may be accompanied by updated wallet profile data for the sender device's blockchain wallet.

In step 306, the receiving device 202 of the processing server 102 may receive the transaction reference from the sender wallet provider 116. In step 308, the processing server 102 may identify the blockchain transaction that corresponds to the received transaction reference. Identification of the blockchain transaction may include the querying module 214 of the processing server 102 executing a query on the blockchain data 210 in the processing server 102 to identify a blockchain data value that includes the transaction reference, or the transmission of a data request by the transmitting device 220 of the processing server 102 to a blockchain node 106 with the transaction reference and receipt of the blockchain data value therefrom. Once the blockchain data value has been received, the processing server 102 may identify, in step 310, the blockchain wallet associated with the receiver device 114 as a recipient of the blockchain transaction, such as by reviewing the destination address(es) in the blockchain data value.

In step 312, the querying module 214 of the processing server 102 may execute a query on the wallet database 206 of the processing server 102 to identify a wallet profile 208 related to the identified blockchain wallet to identify the receiver wallet provider 118 associated therewith. In step 314, the transmitting device 220 of the processing server 102 may electronically transmit a notification message to the identified receive wallet provider 118 that includes the transaction reference and requests verification of the transaction and an updating of the identified wallet profile 208. In some instances, the request may specify data necessary for the updating of the identified wallet profile 208.

In step 316, the receiver wallet provider 118 may receive the notification message. In step 318, the receiver wallet provider 118 may return a verification message to the processing server 102 that verifies the transaction that occurred that is tied to the transaction reference and that also provides any updated wallet profile data for the receiver device's blockchain wallet, as applicable. In step 320, the receiving device 202 of the processing server 102 may receive the transaction verification message from the receiver wallet provider 118. In step 322, the querying module 214 of the processing server 102 may execute a query on the wallet database 206 to update the wallet profile 208 with any new wallet profile data received from the receiver wallet provider 118.

Exemplary Method for Assisting Wallet Providers in Regulatory Compliance

Figure 4:
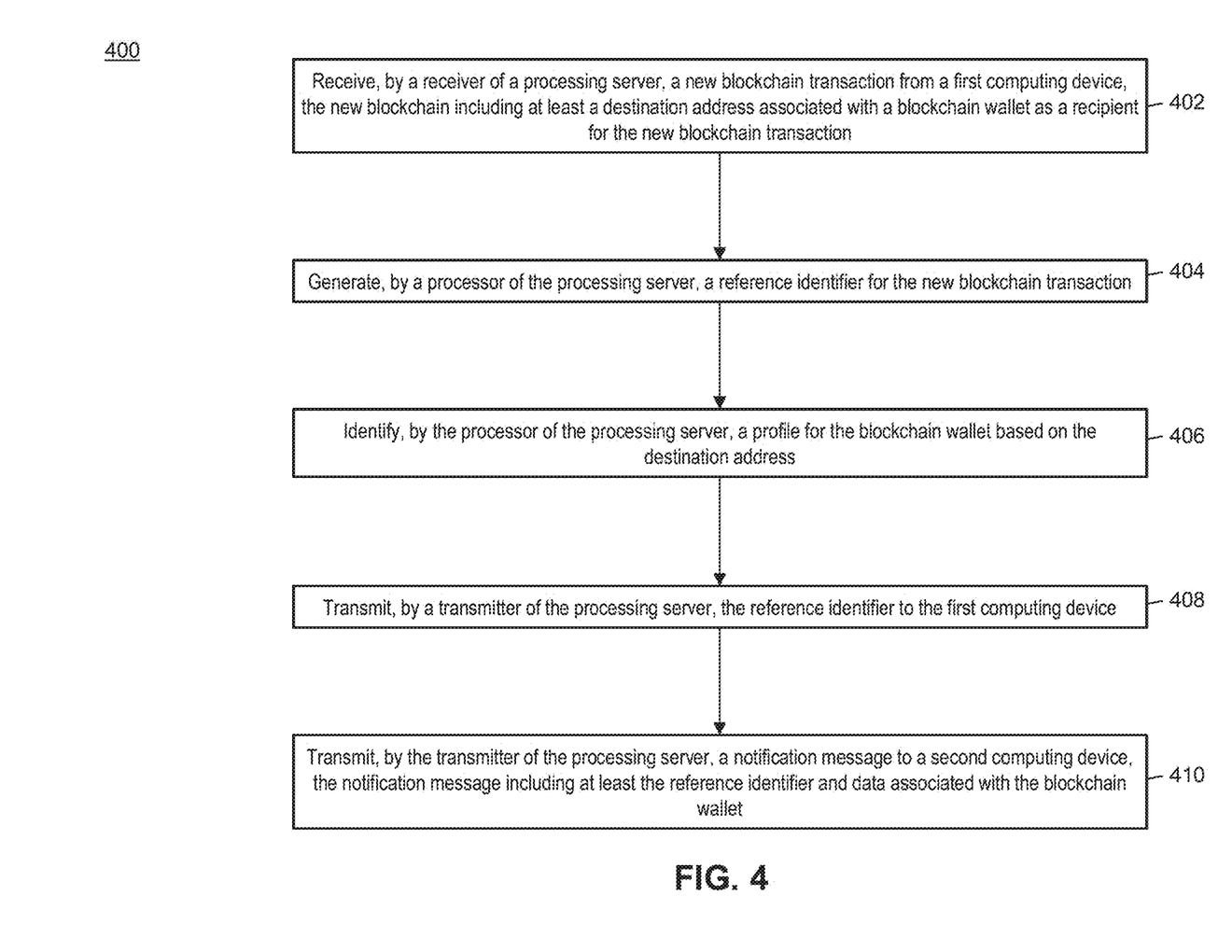
FIG. 4 is a flow chart illustrating an exemplary method for assisting wallet providers in regulatory compliance for blockchain transactions in accordance with exemplary embodiments.

FIG. 4 illustrates a method 400 for assisting blockchain wallet providers in ensuring regulatory compliance in a blockchain transaction through reference identifiers and reporting of blockchain transaction data.

In step 402, a new blockchain transaction may be received by a receiver (e.g., receiving device 202 of a processing server (e.g., processing server 102) from a first computing device (e.g., sender wallet provider 116), the new blockchain including at least a destination address associated with a blockchain wallet as a recipient for the new blockchain transaction. In step 404, a reference identifier for the new blockchain transaction may be generated by a processor (e.g., generation module 216) of the processing server.

In step 406, a profile (e.g., wallet profile 208) for the blockchain wallet may be identified by the processor (e.g., querying module 214) of the processing server based on the destination address. In step 408, the reference identifier may be transmitted by a transmitter (e.g., transmitting device 220) of the processing server to the first computing device. In step 410, a notification message may be transmitted to a second computing device (e.g., receiver wallet provider 118) by the transmitter of the processing server the notification message including at least the reference identifier and data associated with the blockchain wallet.

In one embodiment, the data associated with the blockchain wallet may be at least one of: a public key and an identification number. In some embodiments, the second computing device may be identified using a portion of the public key or a portion of the identification number. In one embodiment, the first computing device may be a first wallet provider that operates an electronic wallet as a sender for the new blockchain transaction, and the second computing device may be a second wallet provider that operates the blockchain wallet as the recipient for the new blockchain transaction.

In some embodiments, the first computing device may be a blockchain node (e.g., blockchain node 106) in a blockchain network (e.g., blockchain network 104) that manages a blockchain used for the new blockchain transaction. In one embodiment, the data associated with the blockchain wallet may include identifying information of a user (e.g., user 110) associated with the blockchain wallet. In some embodiments, the data associated with the blockchain wallet may include data regarding compliance with one or more regulatory requirements for the blockchain wallet. In one embodiment, the method 400 may further include receiving, by the receiver of the processing server, a verification message from the second computing device, the verification message indicating verification of the new blockchain transaction.

Computer System Architecture

FIG. 5 illustrates a computer system 500 in which embodiments of the present disclosure, or portions thereof, may be implemented as computer-readable code. For example, the processing server 102, blockchain node 106, sender device 112, receiver device 114, sender wallet provider 116, receiver wallet provider 118, and regulatory agency 120 of FIG. 1 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for assisting wallet providers in regulatory compliance for blockchain transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for assisting wallet providers in regulatory compliance for anonymous blockchain transactions, comprising:

storing, by a processing server in a wallet database, one or more wallet profiles, each of the one or more wallet profiles associated with at least one blockchain wallet, wherein each of the wallet profiles comprises a public key of a cryptographic key pair associated with the respective at least one blockchain wallet, profile data, the profile data including compliance information;

receiving, by the processing server, blockchain transaction data from a first computing device of a first wallet provider, wherein the blockchain transaction data comprises a digital signature associated with a sender blockchain wallet, one or more unspent transaction outputs, and a destination address associated with a recipient blockchain wallet of a second wallet provider, wherein the processing server receives the blockchain transaction data prior to the first computing device generating a first blockchain data value based on the blockchain transaction data;

identifying, by the processing server, a recipient wallet profile associated with the recipient blockchain wallet by querying the one or more wallet profiles in the wallet database using the destination address associated with the recipient blockchain wallet;

generating, by the processing server, a reference identifier for the blockchain transaction data;

transmitting, by the processing server, the reference identifier and the profile data of the recipient wallet profile to the first computing device;

receiving, by the processing server, from the first computing device a transaction reference for a blockchain transaction after the first computing device generating the first blockchain data value based on the blockchain transaction, wherein the blockchain transaction comprises the blockchain transaction data and the reference identifier, wherein the receiving the transaction reference further comprises identifying the blockchain data value using the transaction reference, and identifying the recipient blockchain wallet associated with the destination address comprised in the blockchain data value;

transmitting, by the processing server to a second computing device of the second wallet provider, a notification message to request verification for the blockchain transaction, wherein the notification message comprises at least the transaction reference;

receiving, by the processing server from the second computing device, a message for the verification of the blockchain transaction in response to the notification message; and providing, by the processing server, to a third computing device associated with a regulatory agency, a report about the blockchain transaction, wherein the report comprises the reference identifier, the profile data associated with the recipient blockchain wallet, and profile data associated with the sender blockchain wallet.

2. The method of claim 1, wherein the recipient wallet profile of the recipient blockchain wallet further comprises at least one of: a public key and an identification number.

3. The method of claim 2, wherein identifying the recipient wallet profile of the recipient blockchain wallet comprises using a portion of the public key or a portion of the identification number.

4. The method of claim 1, wherein the compliance information includes one or more of: a name, an address, a geographic location, a business name, transactional history, and financial data.

5. The method of claim 1, wherein the first computing device is a blockchain node in the blockchain network that manages a blockchain used for the blockchain transaction.

6. The method of claim 1, wherein the recipient wallet profile associated with the recipient blockchain wallet comprises information of a user associated with the recipient blockchain wallet.

7. The method of claim 1, wherein the compliance information of the one or more wallet profiles associated with the blockchain wallets comprises data regarding compliance with one or more regulatory requirements of the regulatory agency for the blockchain wallets.

8. The method of claim 1, further comprising:
receiving, by the processing server, a verification message from the second computing device, wherein the verification message comprises updates of the recipient wallet profile of the recipient blockchain wallet.

9. The method of claim 1, wherein the identifying the recipient wallet profile associated with the recipient blockchain wallet further comprises:
determining, by the processing server, that the recipient wallet profile is not in the wallet database by querying the wallet database using the destination address;
transmitting, by the processing server, a request to the second computing device for information of the recipient wallet profile including the profile data;
receiving, by the processing server via the receiver, a response from the second computing device, wherein the response comprises the information of the recipient wallet profile including the profile data; and
storing, by the processing server in the wallet database, the received information in the recipient wallet profile.

10. The method of claim 1, further comprising:
receiving, by the processing server, a transaction reference associated with a new blockchain transaction;
executing, by the processing server, a query on a blockchain of the blockchain network for the new blockchain transaction corresponding to the transaction reference associated with a new blockchain transaction;
identifying, by the processing server, a second blockchain data value on the blockchain that includes the transaction reference, the second blockchain data value corresponding to the new blockchain transaction;
determining, by the processing server, that a destination address of the second blockchain data value matches the recipient blockchain wallet of the new blockchain transaction;
executing, by the processing server, a query on the wallet database for the recipient wallet profile associated with the recipient blockchain wallet;
identifying, by the processing server, the recipient wallet profile, wherein the recipient wallet profile comprises information of the second wallet provider;
transmitting, by the processing server, a verification request to the second computing device, the verification request including the transaction reference and a request for verification of the new blockchain transaction;
receiving, by the processing server, a verification message from the second computing device, wherein the verification message comprises updated recipient wallet profile data for the recipient blockchain wallet; and
updating, by the processing server, the recipient wallet profile in the wallet database with the updated wallet profile data for the recipient blockchain wallet.

11. A system for assisting wallet providers in regulatory compliance for anonymous blockchain transactions, comprising:

a processing server comprising a receiver, a transmitter and a memory storing a wallet database, wherein the processing server is configured to:
  store, in the wallet database, one or more wallet profiles, each of the one or more wallet profiles associated with at least one blockchain wallet, wherein each of the one or more wallet profiles comprises a public key of a cryptographic key pairs associated with the respective at least one blockchain wallet, and profile data, the profile data including compliance information;
  receive, via the receiver, blockchain transaction data from a first computing device of a first wallet provider, wherein the blockchain transaction data comprises a digital signature associated with a sender blockchain wallet, one or more unspent transaction outputs, and a destination address associated with a recipient blockchain wallet of a second wallet provider, wherein the receiver receives the blockchain transaction data prior to the first computing device generating a blockchain data value based on the blockchain transaction data;
  identify a recipient wallet profile associated with the recipient blockchain wallet by querying the one or more wallet profiles in the wallet database using the destination address associated with the recipient blockchain wallet;
  generate a reference identifier for the blockchain transaction data;
  transmit, via the transmitter, the reference identifier and the profile data included in the recipient wallet profile to the first computing device;
  receive, via the receiver, from the first computing device a transaction reference for a blockchain transaction after the first computing device generating the first blockchain data value based on the blockchain transaction, wherein the blockchain transaction comprises the blockchain transaction data and the reference identifier, wherein the receiving the transaction reference further comprises identifying the blockchain data value using the transaction reference, and identifying the recipient blockchain wallet associated with the destination address comprised in the blockchain data value;
  transmit, to a second computing device of the second wallet provider, a notification message to request verification for the blockchain transaction, wherein the notification message comprises at least the transaction reference;
  receiving, by the processing server from the second computing device, a message for the verification of the blockchain transaction in response to the notification message; and
  provide, to a third computing device associated with a regulatory agency, a report about the first blockchain transaction, wherein the report comprises the reference identifier, the profile data associated with the recipient blockchain wallet, and profile data associated with the sender blockchain wallet.

12. The system of claim 11, wherein the recipient wallet profile of the recipient blockchain wallet further comprises is at least one of: a public key and an identification number.

13. The system of claim 11, wherein identifying the recipient wallet profile of the recipient blockchain wallet comprises using a portion of the public key or a portion of the identification number.

14. The system of claim 11, wherein the compliance information includes one or more of: a name, an address, a geographic location, a business name, transactional history, and financial data.

15. The system of claim 11, wherein the first computing device is a blockchain node in the blockchain network that manages a blockchain used for the blockchain transaction.

16. The system of claim 11, wherein the recipient wallet profile associated with the recipient blockchain wallet comprises information of a user associated with the recipient blockchain wallet.

17. The system of claim 11, wherein the compliance information of the one or more wallet profiles associated with the blockchain wallets comprises data regarding compliance with one or more regulatory requirements of the regulatory agency for the blockchain wallets.

18. The system of claim 11, wherein the processing server is further configured to:
  receive, via the receiver, a verification message from the second computing device, wherein the verification message comprises updates of the recipient wallet profile of the recipient blockchain wallet.

19. The system of claim 11, wherein the identifying the recipient wallet profile associated with the recipient blockchain wallet further comprises:
  determining that the recipient wallet profile is not in the wallet database by querying the wallet database using the destination address;
  transmitting, via the transmitter, a request to the second computing device for information of the recipient wallet profile including the profile data;
  receiving, via the receiver, a response from the second computing device, wherein the response comprises the information of the recipient wallet profile including the profile data;
  storing, in the wallet database, the received information in the recipient wallet profile.

20. The system of claim 11, the processing server is further configured to:
  receive, via the receiver, a transaction reference associated with the new blockchain transaction;
  execute a query on a blockchain of the blockchain network for the new blockchain transaction corresponding to the transaction reference associated with a new blockchain transaction;
  identify a second blockchain data value on the blockchain that includes the transaction reference, the second blockchain data value corresponding to the new blockchain transaction;
  determine that a destination address of the second blockchain data value matches the recipient blockchain wallet of the new blockchain transaction;
  execute a query on the wallet database for the recipient wallet profile associated with the recipient blockchain wallet;
  identify the recipient wallet profile, wherein the recipient wallet profile comprises information of the second wallet provider;
  transmit, via the transmitter the processing server, a verification request to the second computing device, the verification request including the transaction reference and a request for verification of the new blockchain transaction;
  receive, via the receiver, a verification message from the second computing device, wherein the verification message comprises updated recipient wallet profile data for the recipient blockchain wallet; and
  update the recipient wallet profile in the wallet database with the updated wallet profile data for the recipient blockchain wallet.

* * * * *